United States Patent
Miller, deceased

[15] 3,698,669
[45] Oct. 17, 1972

[54] METHOD AND APPARATUS FOR CONTROLLING THE FLIGHT PATH ANGLE OF AIRCRAFT

[72] Inventor: Justin G. Miller, deceased, late of Los Angeles, Calif. by Rita Ann Miller, administratrix

[73] Assignee: Lear Siegler, Inc., Santa Monica, Calif.

[22] Filed: March 16, 1970

[21] Appl. No.: 19,813

Related U.S. Application Data

[63] Continuation-in-part of Ser. No. 845,113, May 29, 1969.

[52] U.S. Cl. ............................................. 244/77 A
[51] Int. Cl. ............................................. B64c 13/18
[58] Field of Search .244/77 R, 77 A, 77 D; 318/583, 318/584; 343/107, 108; 235/150.22

[56] References Cited

UNITED STATES PATENTS 3,147,424  9/1964  Miller .................. 244/77 D X
3,295,796  1/1967  Gaylor .................... 244/77 A
3,126,474  3/1964  Zweibel et al. ........ 244/77 A X
2,896,145  7/1959  Snodgrass ............ 244/77 D X Primary Examiner—Milton Buchler
Assistant Examiner—Jeffrey Forman
Attorney—Harold L. Jackson, Stanley R. Jones, Robert M. Vargo and Eric T. S. Chung

[57] ABSTRACT

A flight command system resolves an aircraft vector speed signal as a function of the vertical and horizontal components of a selected aircraft flight path angle to respectively produce commanded vertical and horizontal speed signals. The speed command signals are respectively compared with actual values of aircraft vertical and horizontal speeds to produce vertical and horizontal speed error signals, respectively, and the speed error signals indicate the deviation of the aircraft from the selected flight path angle. The system achieves vector speed control and flight path angle control simultaneously when the aircraft vector speed signal represents a desired aircraft vector speed. When a vertical path displacement error signal is combined with the commanded aircraft vertical speed signal, the system achieves flight path angle control along a specific path in space.

16 Claims, 5 Drawing Figures

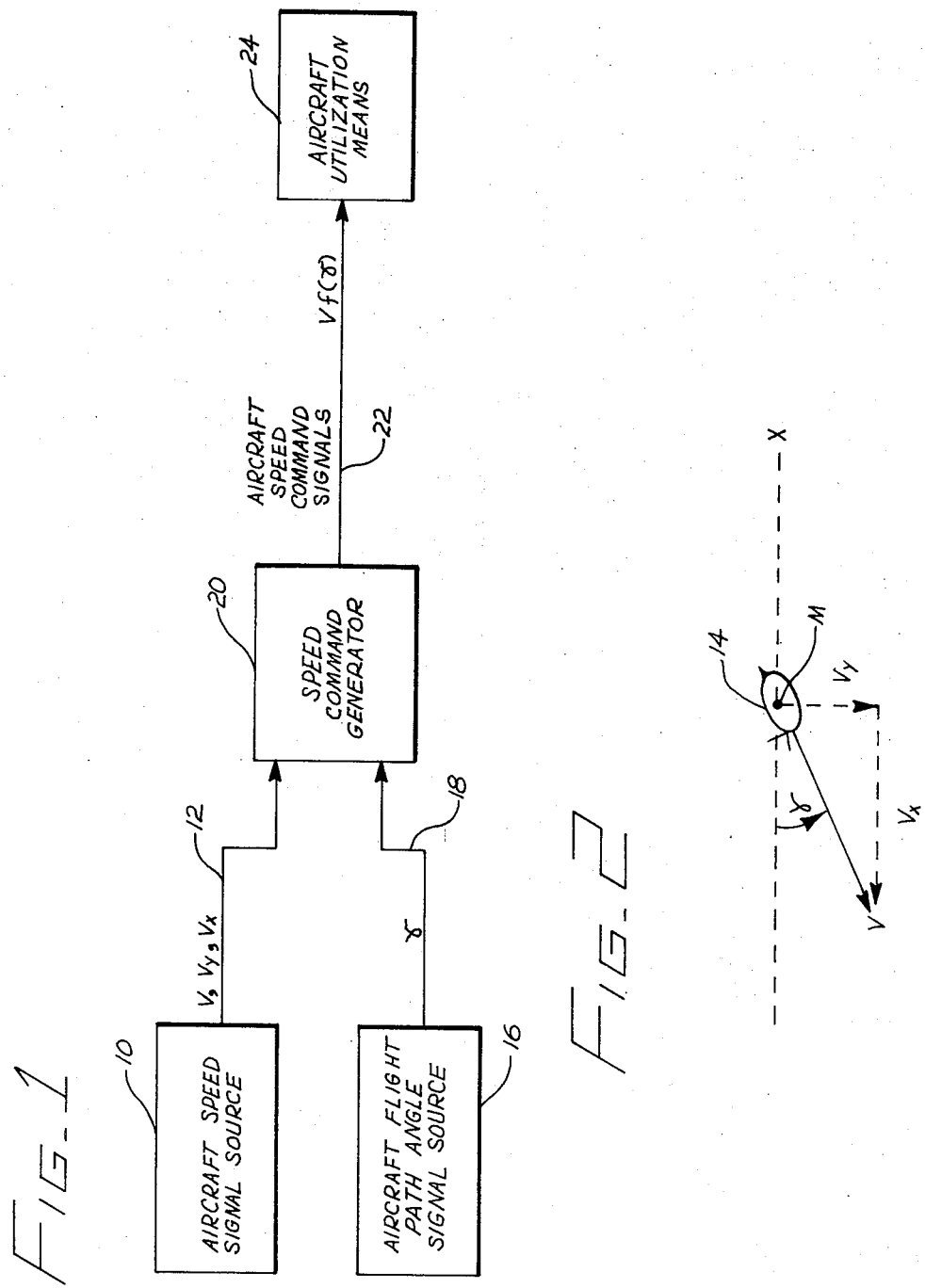

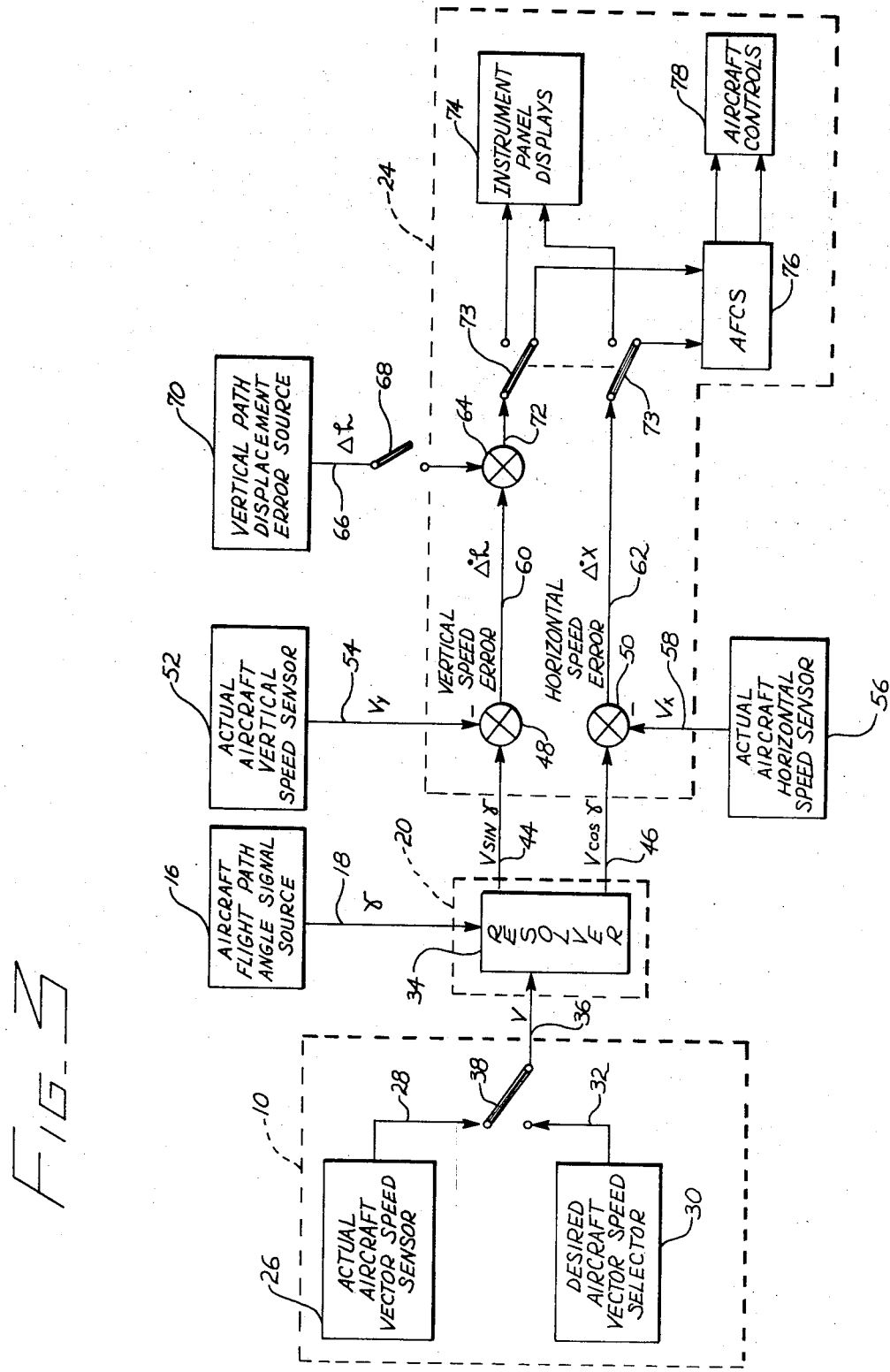

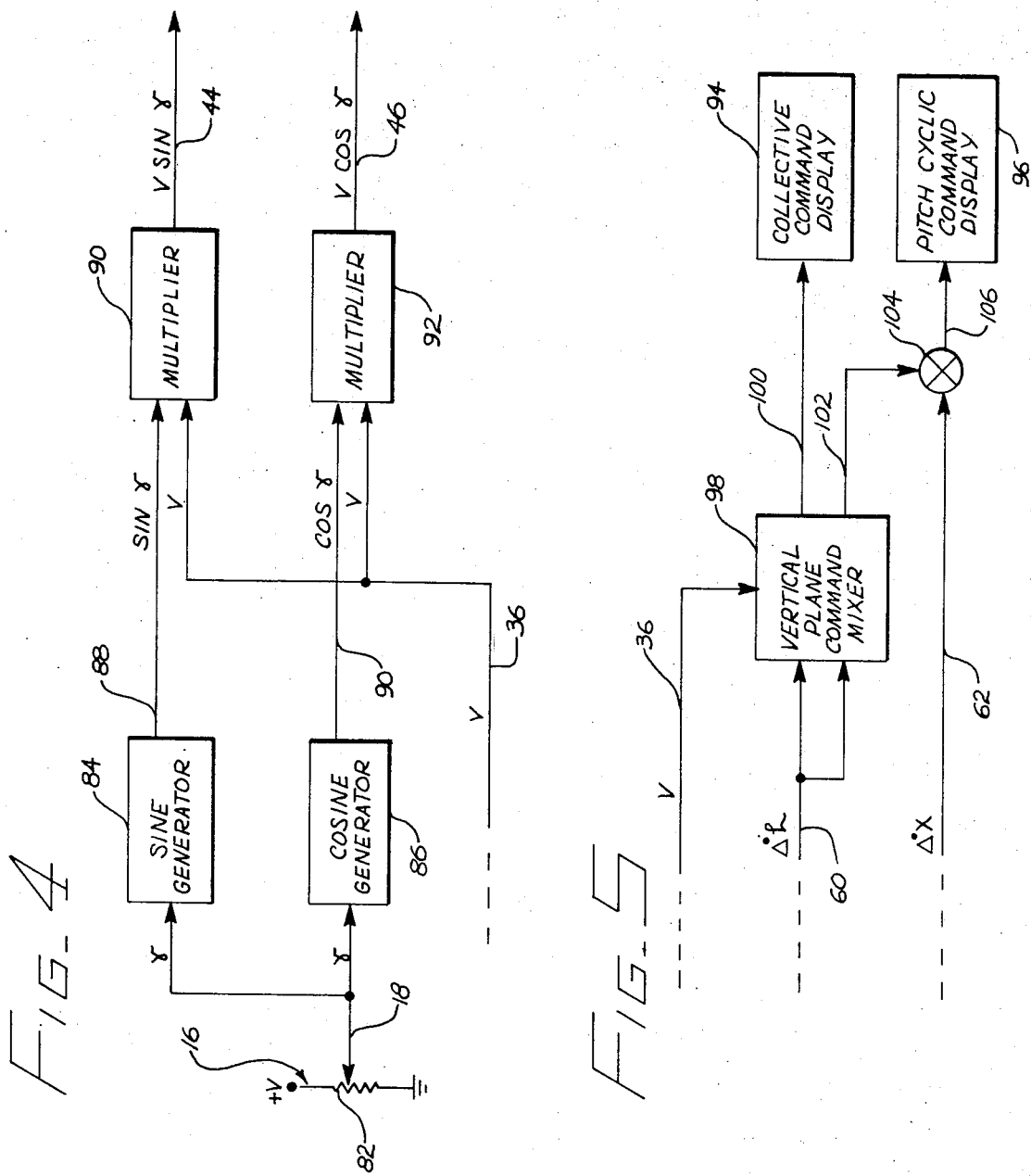

METHOD AND APPARATUS FOR CONTROLLING THE FLIGHT PATH ANGLE OF AIRCRAFT

CROSS-REFERENCE TO RELATED APPLICATION

This is a continuation-in-part of application Ser. No. 845,113, filed May 29, 1969.

BACKGROUND OF THE INVENTION

1. Field of the Invention

This invention relates to flight command systems for aircraft, and more particularly to a system for commanding an aircraft to follow a predetermined flight path angle. The system is particularly useful for controlling the flight path angle of vertical take-off and landing (VTOL) and vertical/short take-off and landing (V/STOL) aircraft.

2. Description of the Prior Art

The recent increase in air traffic congestion has emphasized the need for systems capable of assisting a pilot is accurately guiding an aircraft to the terminal area. At the present time, instrument landing approach systems provide a radio beam or a "glideslope" beam which defines a fixed descent path to the landing site, and the pilot makes an accurate terminal approach and landing by maneuvering the aircraft to follow the glideslope beam.

The increase in both air traffic and the speed of aircraft makes it desirable to accurately guide aircraft to the terminal area along a fixed descent path or aircraft flight path angle from locations far in advance of the point where the glideslope beam is acquired. The use of aircraft capable of flying a wide envelope of descent paths from cruise flight to the terminal area increases the traffic that can be accommodated by an airport. The need for a flight command system capable of commanding such aircraft to accurately fly a wide variety of descent paths is apparent. Besides increasing the air traffic accommodated in the terminal area, precise control of the aircraft flight path angle improves fuel economy and noise abatement.

At the present time, however, aircraft are not equipped with systems for directly controlling flight path angle far in advance of the terminal area. For instance, aircraft flight path angle is difficult to measure precisely, and as a result, flight path angle information is rarely used by the pilot for controlling the aircraft during this transition from cruise flight to the terminal area.

SUMMARY OF THE INVENTION

This invention is based on the recognition that aircraft speed information such as aircraft vector speed, horizontal speed, or vertical speed is normally available to the pilot from sensors aboard the aircraft. The sensed aircraft speed information is compared with one or more speed command signals which define a selected flight path angle to indicate the deviation of the aircraft from the desired flight path angle.

Briefly, the apparatus of this invention provides a system for commanding an aircraft to maintain a selected flight path angle. The system is responsive to aircraft horizontal speed, vertical speed, or vector speed, and includes means for producing a first signal representative of one of the above aircraft speed components. The system further includes means for producing a second signal representative of a selected aircraft flight path angle, and means responsive to the first and second signals for producing at least one aircraft speed command signal representative of one of the above remaining aircraft speed components. Aircraft utilization means responsive to the signals representative of two of the above aircraft speed components maintain aircraft flight along the selected flight path angle. Thus, the desired aircraft flight path angle is selected by the pilot and the aircraft utilization means is used to maneuver the aircraft to maintain the desired flight path angle.

In a preferred form of the invention, an aircraft vector speed signal is resolved as a function of horizontal and vertical components of the selected flight path angle to respectively produce commanded aircraft horizontal and vertical speed signals. Sensing means produce actual speed signals representative of the actual value of aircraft horizontal and vertical speeds, and the aircraft utilization means compares the actual speed signals with the aircraft speed command signals to produce horizontal and vertical speed error signals indicating the deviation of the aircraft from the selected flight path angle.

Preferably, the system of this invention provides aircraft vector speed control in combination with flight path angle control when the aircraft speed component represented by the first signal is a selected or desired speed component. Furthermore, this preferred system is adapted to receive a signal in the form of a vertical path displacement error referenced to a specific path in space for comparison with the aircraft vertical speed error signal. The latter system achieves flight at a selected speed along a selected flight path angle defined by the specific path in space.

The invention further contemplates a method for commanding an aircraft to maintain a selected flight path angle using an aircraft speed component in the form of aircraft horizontal speed, vertical speed, or vector speed. Briefly, the method includes the steps of (a) generating a first signal which represents one of the above aircraft speed components; (b) generating a second signal which represents a selected aircraft flight path angle and (c) generating from the first and second signals at least one aircraft speed command signal representing one of the above remaining aircraft speed components. The aircraft is maneuvered in response to the signals representative of two of the above aircraft speed components for maintaining flight along the selected flight path angle.

The flight path control provided by the apparatus and method of this invention is preferably used to guide an aircraft accurately from cruise flight conditions to the terminal area where the glideslope beam is intercepted. The pilot selects the desired flight path angle, and the resulting speed command signals are used for continuously maintaining the aircraft on the desired angle.

The apparatus and method of this invention are particularly useful in controlling the flight path angle of VTOL and V/STOL aircraft. At cruise speeds the VTOL-V/STOL pitch cyclic control has a significant influence on both longitudinal speed and vertical speed, and the VTOL-V/STOL collective stick is generally locked in position. VTOL-V/STOL aircraft using the system or method of this invention maintain cruise flight along a selected flight path angle using manual or automatic pitch cyclic control to maintain the speeds required to hold the aircraft on the desired angle.

During the transition from cruise speeds to hover speeds, the pilot of the VTOL-V/STOL aircraft is required to make increasingly greater use of the collective stick to control vertical speed, while the pitch cyclic stick is exclusively used to control longitudinal velocity. Patent application Ser. No. 845,113, filed May 29, 1969, discloses an aircraft command mixing device that schedules vertical and horizontal speed command information as a function of aircraft speed for application to the pitch cyclic and collective controls of VTOL and V/STOL aircraft to reflect the above-described transition from cruise flight to hover. The apparatus and method of this invention is adapted for use in combination with the collective and pitch cyclic controls of VTOL-V/STOL aircraft and with the vertical plane command mixing device for maintaining continuous flight path angle control from cruise flight to hover. This particular adaptation of the invention is significant in the context of the presently increasing problem of air traffic congestion. VTOL and V/STOL aircraft are particularly capable of alleviating substantial congestion because of their ability both to make expeditious take-offs and landings and to fly a wide envelope of descent paths to the terminal site. The accurate flight path angle control provided by this invention increases the number of aircraft accommodated in the terminal area.

BRIEF DESCRIPTION OF THE DRAWINGS

The features of specific embodiments of the best mode contemplated of carrying out the invention are illustrated in the drawings, in which:

FIG. 1 is a block diagram showing the basic operation of the flight command system of this invention;

FIG. 2 is a diagram defining aircraft flight path angle;

FIG. 3 is a block diagram showing the operation of a preferred flight command system;

FIG. 4 is a block diagram showing the operation of a preferred system of function generators implementing the system of FIG. 3; and FIG. 5 is a block diagram showing the use of this invention in conjunction with the steering controls of a VTOL or V/STOL aircraft.

DETAILED DESCRIPTION OF THE SPECIFIC EMBODIMENTS

Referring to FIGS. 1 and 2, an aircraft speed signal source 10 produces an aircraft speed signal 12 representing a speed component of an aircraft 14. Preferably, speed signal 12 represents a speed component of an aircraft 14. Preferably, speed signal 12 represents either the speed vector V of the mass center M of the aircraft, the vertical component $V_y$ of speed vector V, or the horizontal component $V_x$ of speed vector V. A flight path angle signal source 16 produces a selected or desired flight path angle signal 18 representing the magnitude $\gamma$ of the angle between the true horizontal plane X and aircraft speed vector V.

Aircraft speed signal 12 and flight path angle signal 18 are both fed to a speed command generator 20 which produces one or more aircraft speed command signals 22 representing the aircraft speed component V, $V_y$, or $V_x$ resolved as a function of aircraft flight path angle. Aircraft speed command signals 22 are fed to aircraft utilization means 24 for controlling the aircraft speed component to maintain the selected flight path angle $\gamma$.

FIG. 3 shows preferred means for implementing the flight command system of FIG. 1. Aircraft speed signal source 10 is represented by a sensor 26 for measuring actual aircraft vector speed and for producing an output signal 28 representing actual aircraft vector speed. Alternatively, aircraft speed signal source 10 is represented by a selector 30 which provides an output signal 32 representing desired aircraft vector speed. Typically, selector 30 comprises onboard pilot-select equipment which allows the pilot to preselect the commanded vector speed of the aircraft. Alternatively, selector 30 can represent a flight command computer programmed to provide desired vector speed information in accordance with a particular preselected speed schedule. For example, desired aircraft vector speed signal 32 can represent a deceleration speed schedule developed in accordance with the deceleration command network disclosed in the patent application of Justin G. Miller, Ser. No. 870,008, filed Oct. 22, 1969.

Speed command generator 20 preferably comprises a resolver 34 which receives a vector speed signal 36 having a magnitude V representing either actual aircraft vector speed signal 28 or desired aircraft vector speed signal 32 depending upon the position of a switch 38. Resolver 34 also receives a flight path angle signal 18 from aircraft flight path angle signal source 16. Resolver 34 produces both a commanded aircraft vertical speed signal 44 having a magnitude V sin $\gamma$ representing the vertical speed component of aircraft vector speed V and a commanded aircraft horizontal speed signal 46 having a magnitude V cos $\gamma$ representing the horizontal speed component of aircraft vector speed V.

Commanded aircraft vertical speed signal 44 and commanded aircraft horizontal speed signal 46 are respectively fed to a vertical speed comparison device or summing device 48 and a horizontal speed comparison device or summing device 50. Summing devices 48 and 50 comprise part of the aircraft utilization means 24 in that they are used to determine the deviation of the air-craft from the selected flight path angle $\gamma$. A sensor 52 measures actual aircraft vertical speed and produces an output signal 54 having a magnitude $V_y$ which represents actual aircraft vertical speed. A sensor 56 measures actual aircraft horizontal speed and produces an output signal 58 having a magnitude $V_x$ representing actual aircraft horizontal speed. Commanded vertical speed signal 44 and actual vertical speed signal 54 are both fed to summing device 48 which produces a vertical speed error signal 60 having a magnitude $\Delta h$ representing the algebraic difference between signals 44 and 54. Similarly, commanded horizontal speed signal 46 and actual horizontal speed signal 58 are both fed to summing device 50 which produces a horizontal speed error signal 62 having a magnitude $\Delta X$ representing the algebraic difference between signals 46 and 58.

A vertical error comparison device or summing device 64 receives a vertical path displacement error signal 66 when a switch 68 is closed. Vertical path displacement error signal 66 represents the deviation of the aircraft from a specific earth-referenced path in the vertical plane. This signal is produced by a vertical path displacement error source 70 such as an instrument landing system glideslope facility or similar vertical plane navigation equipment. Vertical path displacement error signal 66 and vertical speed error signal 60 are both fed to summing device 64 to produce a vertical control signal 72 representing the algebraic sum of signals 60 and 66.

During use of the system shown in FIG. 3, vertical control signal 72 and horizontal speed error signal 62 are respectively used to control aircraft vertical and horizontal speed so that the instantaneous aircraft speed vector maintains the desired flight path angle. Depending upon the position of a pair of ganged switches 73, signals 72 and 62 are either fed to instrument panel displays 74 to assist the pilot in maneuvering the aircraft along the desired angle, or they are coupled to an automatic flight control system 76 for automatically operating aircraft controls 78. Either the instrument panel displays 74 or the automatic flight control system 76 comprise aircraft utilization means for maintaining aircraft flight along the selected flight path angle as that term is here used, in that both of these are utilization means that have as their purpose maintaining the flight path angle.

In use, the system shown in FIG. 3 controls the particular mode of flight along the selected flight path angle in response to the placement of switches 38 and 68. When switches 38 and 68 are placed in the positions shown in FIG. 3, a first mode of operation is provided wherein flight path angle control at any actual aircraft vector speed is achieved. When a desired vector speed is substituted for actual vector speed by placing switch 38 in the position opposite to that shown in FIG. 3, a second mode of operation is provided wherein aircraft flight path angle and aircraft vector speed are both controlled. That is, the aircraft achieves flight along the selected flight path angle at the desired speed simultaneously. When the second mode of operation is combined with a vertical path displacement error by closing switch 68, a third mode of operation is provided wherein the aircraft achieves precise flight at the desired vector speed along the particular flight path angle defined by a specific earth-referenced path in the vertical plane.

Vector speed signals 28 and 32 represent aircraft speed command signals in the sense that they are resolved as a function of selected flight path angle to produce vertical and horizontal speed command signals 44 and 46. Furthermore, vector speed signal 32 in its unresolved condition is a speed command signal in the sense that it represents the desired vector speed of the aircraft. An alternative means for maintaining flight path angle control is to resolve from vector speed signal 32 either vertical speed command signal 44 or horizontal speed command signal 46, and to then combine vector speed signal 32 with either signal 44 or signal 46 for application to aircraft utilization means to maintain flight on the selected flight path angle.

FIG. 4 shows a preferred system of function generators for implementing the flight command system of FIG. 3. Aircraft flight path angle signal source 16, preferably in the form of a potentiometer 82, produces output signal 18 having a magnitude proportional to the pilot selected flight path angle γ. The selected flight path angle is then resolved into its horizontal and vertical components by applying signal 18 to a sine generator 84 and a cosine generator 86. Sine generator 84 produces an output signal 88 having a magnitude proportional to the sine of the flight path angle γ. Cosine generator 86 produces an output signal 90 having a magnitude proportional to the cosine of the flight path angle γ. Aircraft vector speed signal 36 and sine generator output signal 88 are both fed to a first multiplier 90 to produce commanded aircraft vertical speed signal 44 having a magnitude proportional to the product of signals 36 and 88. Aircraft vector speed signal 36 and cosine generator output signal 90 are fed to a second multiplier 92 to produce commanded aircraft horizontal speed signal 46 having a magnitude proportional to the product of signals 90 and 36. As previously described, commanded vertical and horizontal speed signals 44 and 46 are then fed to aircraft utilization means 24 for use in maintaining aircraft flight along the selected flight path angle.

The flight command system of this invention is particularly useful in conjunction with VTOL and V/STOL aircraft, and FIG. 5 shows an application of aircraft utilization means 24 which includes a collective command display 94 and a pitch cyclic command display 96 of a typical VTOL or V/STOL aircraft. A vertical plane command mixer 98 described in application Ser. No. 845,113, filed May 29, 1969 operates in response to aircraft vector speed signal 36. Vertical speed error signal 60 is routed to vertical plane command mixer 98 which schedules signal 60 as a function of vector speed signal 36 to produce both an output signal 100 for application to collective command display 94 and an output signal 102 which is fed to a summing device 104. Horizontal speed error signal 62 is routed directly to summing device 104. Horizontal speed error signal 62 is routed directly to summing device 104 where it is summed with output signal 102 to produce a pitch control signal 106 for application to the pitch cyclic command display 96. Thus, when the flight command system of this invention is implemented as shown in FIG. 5, flight path angle control for VTOL or V/STOL aircraft is continuously maintained from cruise speeds to hover.

The present invention has been described in the context of a preferred system for commanding an aircraft to fly a selected flight path angle; and it is to be understood that certain modifications of this system can be made without departing from the scope of the invention. For example, a signal representing desired aircraft speed can be both resolved to produce one speed command signal and used in unresolved form as a second speed command signal. Both speed command signals can then be used to produce respective error signals indicating the deviation of the aircraft from the selected flight path angle. Furthermore, aircraft vertical speed, for example, instead of aircraft vector speed, can be resolved as a function of horizontal and vector components of a selected flight path angle to produce corresponding aircraft speed command signals for use in controlling the aircraft.

I claim:

1. In a VTOL or V/STOL aircraft, a system for commanding the aircraft to maintain a selected flight path angle, the system comprising:
   a. means for producing a signal representative of aircraft speed;
   b. means for producing a signal representative of a selected aircraft flight path angle;
   c. means responsive to the speed signal and the flight path angle signal for resolving the speed signal into first and second components as a function of the selected flight path angle to produce first and second speed commands, respectively;
   d. means for producing a first and a second actual aircraft speed signal representative of the actual speed of the aircraft in the directions represented by the first and second speed command, respectively; and
   e. means for comparing the first and second actual aircraft speed signals with the first and second speed commands, respectively, to produce first and second speed error signals for use in maintaining the VTOL or V/STOL aircraft on the selected flight path angle.

2. A system according to claim 1 including display means for monitoring the first and second speed error signals.

3. A system according to claim 1 including an automatic flight control system responsive to the first and second speed error signals for automatically maintaining aircraft flight along the selected flight path angle.

4. A system according to claim 1 wherein:
   a. the speed signal is representative of aircraft vector speed;
   b. the first and second speed commands are representative of commanded horizontal speed and commanded vertical speed, respectively; and
   c. the first and second actual aircraft speed signals are representative of actual horizontal and vertical speed of the aircraft, respectively.

5. A system according to claim 4 including:
   a. horizontal speed comparison means responsive to the commanded horizontal speed and the actual horizontal speed for producing a horizontal speed error signal; and
   b. vertical speed comparison means responsive to the commanded vertical speed and the actual vertical speed for producing a vertical speed error signal.

6. A system according to claim 5 including a signal representative of the vertical path displacement error of the aircraft with reference to a desired path in space; and including additional vertical speed comparison means responsive to the vertical path displacement error signal and the vertical speed error signal for producing a vertical control signal for use in maintaining flight of the aircraft along the selected flight path angle defined by the desired path in space.

7. A system according to claim 4 wherein the means for producing the aircraft speed signal is a sensor of the actual vector speed of the aircraft.

8. A system according to claim 4 wherein the means for producing the aircraft speed signal is a selector of aircraft vector speed, and wherein the VTOL or V/STOL aircraft maintains flight along the desired flight path angle at the selected vector speed.

9. A method for commanding an aircraft to maintain a selected flight path angle, the method including the steps of:
   a. generating a signal representative of aircraft speed;
   b. generating a signal representative of a selected aircraft flight angle;
   c. resolving the speed signal into first and second components as a function of the selected flight path angle to produce first and second speed commands, respectively;
   d. generating a first and a second actual aircraft speed signal representative of the actual speed of the aircraft in the directions represented by the first and second speed commands, respectively;
   e. comparing the first and second actual aircraft speed signals with the first and second speed commands, respectively, to produce first and second speed error signals; and
   f. maneuvering the aircraft in response to the first and second error signals to maintain flight along the selected flight path angle.

10. A system for commanding a VTOL or V/STOL aircraft with collective pitch and pitch cyclic steering means to maintain a selected flight path angle, the system comprising:
    a. a sensor for producing a first speed command signal representative of aircraft vector speed;
    b. a selector for producing a second signal representative of a selected aircraft flight path angle;
    c. speed command generating means for resolving from the first and second signals a third signal and a fourth signal representative of commanded aircraft horizontal speed and vertical speed, respectively;
    d. sensing means for producing a fifth signal and a sixth signal representative of actual aircraft horizontal speed and vertical speed, respectively;
    e. horizontal speed comparison means responsive to the third and fifth signals for producing a horizontal speed error signal;
    f. vertical speed comparison means responsive to the fourth and sixth signals for producing a vertical speed error signal; and
    g. aircraft utilization means including means for operating the collective pitch steering means in response to the vertical speed error signal and means for operating the pitch cyclic steering means in response to both the horizontal and vertical speed error signals so as to maintain flight of the VTOL or V/STOL aircraft along the selected flight path angle.

11. A system according to claim 10 wherein the means for operating the collective pitch and pitch cyclic steering means includes display means aboard the VTOL or V/STOL aircraft for monitoring the horizontal and vertical speed error signals.

12. A system according to claim 10 wherein the means for operating the collective pitch and pitch cyclic steering means includes aircraft vertical plane command mixing means responsive to (i) the first speed command signal, (ii) the horizontal speed error signal, and (iii) the vertical speed error signal for coupling the vertical speed error signal to the collective pitch steering means as a function of the aircraft vector speed and for coupling both the vertical and horizontal speed error signals to the pitch cyclic steering means as a function of the aircraft vector speed.

13. A system for commanding an aircraft to maintain a selected flight path angle, the system comprising:

a. means for producing a first speed command signal representative of aircraft vector speed;
b. means for producing a second signal representative of a selected aircraft flight path angle;
c. speed command generating means for resolving from the first and second signal a third signal representative of commanded aircraft horizontal speed and a fourth signal representative of commanded aircraft vertical speed;
d. sensing means for producing a fifth signal representative of actual aircraft horizontal speed and a sixth signal representative of actual aircraft vertical speed; and
e. aircraft utilization means including horizontal speed comparison means responsive to the third and fifth signals for producing a horizontal speed error signal, vertical speed comparison means responsive to the fourth and sixth signals for producing a vertical speed error signal, means for generating a seventh signal representative of the vertical path displacement error of the aircraft with reference to a desired path in space, and means responsive to the seventh signal and the vertical speed error signal for producing a vertical control signal for use in conjunction with the horizontal speed error signal to achieve flight path angle control along the desired path in space.

14. A system for commanding an aircraft to maintain a selected flight path angle, the system comprising:
a. means for producing a first speed signal representative of aircraft vector speed;
b. means for producing a second signal representative of a selected aircraft flight path angle;
c. speed command generating means for resolving from the first and second signals a third signal representative of commanded aircraft horizontal speed and a fourth signal representative of commanded aircraft vertical speed;
d. sensing means for producing a fifth signal representative of actual aircraft horizontal speed and a sixth signal representative of actual aircraft vertical speed; and
e. aircraft utilization means including horizontal speed comparison means responsive to the third and fifth signals for producing a horizontal speed error signal, vertical speed comparison means responsive to the fourth and sixth signals for producing a vertical speed error signal, collective pitch steering means and collective cyclic steering means for a VTOL or V/STOL aircraft, the collective pitch steering means being responsive to the vertical speed error signal, and the pitch steering means being responsive to both the vertical speed error signal and the horizontal speed error signal, for maintaining flight of the aircraft along the selected flight path angle.

15. A system according to claim 14 wherein the aircraft utilization means further includes aircraft vertical plane command mixing means responsive to (i) the first speed command signal, (ii) the horizontal speed error signal, and (iii) the vertical speed error signal for coupling the vertical speed error signal to the collective pitch steering means as a function of the aircraft vector speed and for coupling the vertical speed error signal and the horizontal speed error signal to the pitch cyclic steering means as a function of the aircraft vector speed.

16. A method of commanding a VTOL or V/STOL aircraft with collective pitch and pitch cyclic steering means to maintain a selected flight path angle, the method including the steps of:
a. generating a first speed command signal representative of aircraft vector speed;
b. generating a second signal representative of a selected aircraft flight path angle;
c. resolving, from the first and second signals, a third signal representative of commanded aircraft horizontal speed and a fourth signal representative of commanded aircraft vertical speed;
d. generating a fifth signal representative of actual aircraft horizontal speed and a sixth signal representative of actual aircraft vertical speed;
e. comparing the third signal with the fifth signal to produce a horizontal speed error signal, and comparing the fourth signal with the sixth signal to produce a vertical speed error signal; and
f. maneuvering the collective pitch steering means in response to the vertical speed error signal, and maneuvering the pitch cyclic steering means in response to the vertical speed error signal and the horizontal speed error signal to maintain flight along the selected flight path angle.

* * * * *